United States Patent [19]
Thiele et al.

[11] Patent Number: 5,713,260
[45] Date of Patent: Feb. 3, 1998

[54] APPARATUS FOR PRECISE ADJUSTMENT OF A SAWBLADE

[75] Inventors: Siegfried Thiele, Minden; Jürgen Sensmeier, Löhne, both of Germany

[73] Assignee: Wilheim Altendorf GmbH & Co. KG, Minden, Germany

[21] Appl. No.: 580,077

[22] Filed: Dec. 20, 1995

[30] Foreign Application Priority Data

Dec. 23, 1994 [DE] Germany .................. 94 20 807 U

[51] Int. Cl.$^6$ .................................................. B26D 11/00
[52] U.S. Cl. .................... 83/863; 83/508.2; 83/477.1; 144/3.1
[58] Field of Search ........................ 83/863, 864, 479, 83/481, 485, 486, 487, 489, 490, 508.2, 477, 477.1, 477.2, 498, 499, 504, 508.3; 144/3.1, 136.1

[56] References Cited

U.S. PATENT DOCUMENTS

| | | | |
|---|---|---|---|
| 2,238,481 | 4/1941 | Van Derhoef | 83/481 X |
| 2,512,419 | 6/1950 | Dergance | 83/477.1 X |
| 3,272,042 | 9/1966 | Haas | 83/864 X |
| 3,651,723 | 3/1972 | Gallagher, Jr. et al. | 83/864 X |
| 3,865,000 | 2/1975 | Stafford | 83/504 X |
| 4,010,677 | 3/1977 | Hirakawa et al. | 83/499 X |
| 4,181,164 | 1/1980 | Meniconi | 144/3.1 X |
| 4,188,846 | 2/1980 | Jones et al. | 83/499 X |
| 4,534,256 | 8/1985 | Benuzzi | 83/863 X |
| 4,638,701 | 1/1987 | Oberlander et al. | 83/499 X |
| 4,817,581 | 4/1989 | Trentadue | 83/486 X |

FOREIGN PATENT DOCUMENTS

| | | |
|---|---|---|
| 0 189 095 | 7/1986 | European Pat. Off. . |
| 0 324 444 | 7/1989 | European Pat. Off. . |
| 0 455 592 | 11/1991 | European Pat. Off. . |
| 32 14 219 | 9/1983 | Germany . |
| 40 04 168 | 11/1990 | Germany . |
| 43 29 968 | 3/1994 | Germany . |
| 42 38 936 | 5/1994 | Germany . |
| 568 827 | 11/1975 | Switzerland . |

OTHER PUBLICATIONS

"Feinmechanische Bauelemente "(Precision–mechanical Components), S. Hildebrand, 4th Ed., 1983, pp. 556–557 and 598–599.

"Formats ägen und Plattenaufteils ägen ", Friedmund R üb, pp. 228, 230, Holzbearbeitngsmaschinen, Holztechnik Juni 1972.

*Primary Examiner*—Rinaldi L Rada
*Assistant Examiner*—Boyer Ashley
*Attorney, Agent, or Firm*—Merchant, Gould, Smith, Edell, Welter & Schmidt, P.A.

[57] ABSTRACT

The invention pertains to an apparatus for the precise adjustment of a longitudinally movable component on a spatial axis, especially for the adjustment of the lateral position of the pre-scoring saw blade of a circular saw. This apparatus distinguishes itself by a threaded bolt that is movable around its longitudinal axis, which is parallel to the spatial axis, and has two coaxial thread sections of identical thread orientation and unequal thread pitch. A first thread section engages in a first threaded hole that is immovable in the longitudinal direction of the spatial axis, while the other threaded section engages in a second threaded hole on the longitudinally movable component.

4 Claims, 2 Drawing Sheets

5,713,260

APPARATUS FOR PRECISE ADJUSTMENT OF A SAWBLADE

BACKGROUND OF THE INVENTION

1. Field of the Invention

The invention pertains to an apparatus for the precise adjustment of the position of the pre-scoring saw blade of a circular saw with a saw carriage on which the shaft of a pre-scoring saw.

2. Description of the Prior Art

For technical devices there exists the frequent necessity to precisely adjust various positions of a component. A special application in coarse operation exists with circular saws, particularly those equipped with a pre-scoring aggregate.

Circular saws are widely used as efficient machines for cutting workpieces to size, particularly workpieces made of wood. For example, when cutting sheets that are coated/laminated on both sides, the saw may be equipped with a pre-scoring aggregate that allows a tear-free cutting of the underside of such sheets. The essential element of such a pre-scoring aggregate is a pre-scoring saw blade that normally has a smaller diameter than the main saw blade and is arranged such that the workpiece to be cut passes the pre-scoring saw blade before it reaches the main circular saw blade. The pre-scoring saw blade extends only slightly beyond the supporting surface for the workpiece to be cut so that the workpiece to be cut is not completely severed by the pre-scoring saw blade. The required conditions for the desired effect of a clean cut, both on the upper side and the lower side of a sheet laminated on both sides, is that the cutting groove of the pre-scoring saw blade coincides precisely with that of the main saw blade. To assure this, it is necessary that the pre-scoring saw blade can be precisely positioned laterally. A high repetitive accuracy is desirable for this adjustment.

Additionally, height adjustment is desirable in order to allow, e.g., lowering of the pre-scoring saw blade below the supporting surface for the workpiece to be cut, or to adjust the penetration depth of the pre-scoring saw blade to accommodate various thicknesses of workpiece.

SUMMARY OF THE INVENTION

The object of the invention is a device that serves for the exact positioning of a component, such as a saw carriage carrying a pre-scoring saw blade, movable along an axis, that allows a height adjustment and that can be realized without a major manufacturing engineering expenditure. In order to achieve this goal, a device of the aforementioned type is suggested with an arm attached to the rail, which can be swivelled around a longitudinal axis of the rail. The device, contains at least a second threaded hole with two thread sections with the same thread orientation, but unequal thread pitch, of which one thread section engages in the first threaded hole on the saw carriage, and the other thread section engages in the second threaded hole on the arm.

Although the principle of the differential screw applied here is already known in principle (Siegfried Hildebrand, FEINMECHANISCHE BAUELEMENTE (Precision-mechanical components), 4. edition 1983, pages 556, 557, and 598, 599), the immediate application of this principle is opposed because, in addition to the lateral precise adjustment, e.g., of a pre-scoring saw blade, a height adjustment is also made possible. This is accomplished with the device according to the invention in a particularly simple and attractive way.

In a preferred form of execution, the threaded bolt is attached to a drive motor. Preferentially, the drive motor and the threaded bolts are jointly movable in the direction of the axis of the threaded bolt relative to the unmovable first counter thread.

Furthermore, a variant of the device for the precise adjustment of the lateral position of the pre-scoring saw blade of a circular saw is described where the longitudinally movable component is a saw carriage that carries the pre-scoring saw blade and where the longitudinally immovable first counter thread preferentially has a fixed distance to the cutting plane of the main circular saw blade of the circular saw.

BRIEF DESCRIPTION OF THE DRAWINGS

In the following, the invention will be described in detail on the basis of an example of execution and the figures belonging to it. The figures include.

DESCRIPTION OF THE ILLUSTRATED EMBODIMENTS

Figure 1:
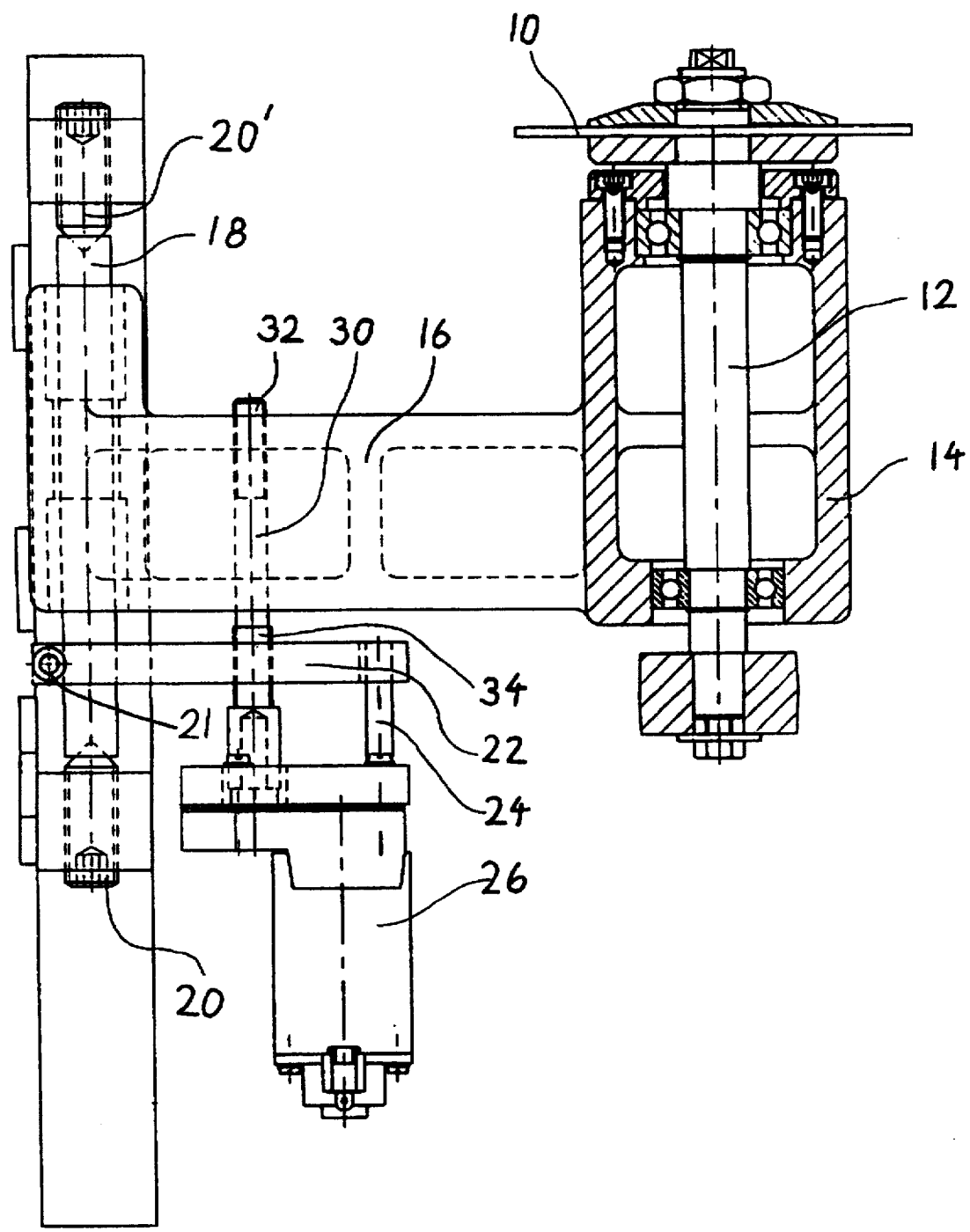
FIG. 1 a top view of a part of a pre-scoring aggregate with a device for a precise adjustment.
Figure 2:
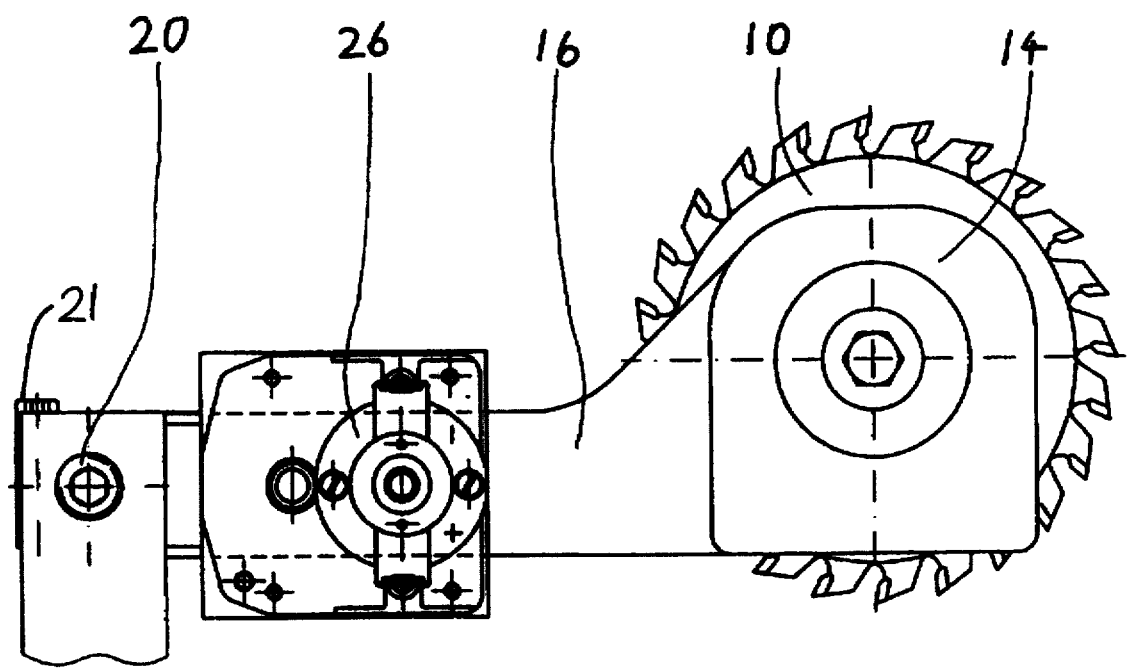
FIG. 2 a side view of the aggregate components from FIG. 1.

Significant elements of a pre-scoring aggregate for the invention are illustrated in FIG. 1. The pre-scoring saw blade 10 is screwed to a shaft 12 that is supported by dual ball bearings on part of a saw carriage 16 that forms a bearing housing 14. The saw carriage 16 is mounted to a guide rail 18 and is longitudinally movable in the direction of shaft 12. The guide rail 18 is connected with the frame of a circular saw, by two studs 20, 20', with one pointed end each, by having the pointed ends extend into recesses on the two ends of the guide rail 18 in a gripping manner. An arm 22 is rigidly attached to the guide rail 18 with the aid of a clamp eye 21. Part of the arm 22 is a guide bolt 24 that is aligned parallel to both the guide rail 18 and the shaft 12, and carries a motor 26 that can be moved longitudinally.

Saw carriage 16, arm 22 and motor 26 are connected to each other by a double-threaded bolt 30. This double-threaded bolt 30 has two thread sections, of which the first thread section 32 is located at the end of double-threaded bolt 30 and is received by a threaded hole in the longitudinally movable saw carriage 16, while the second thread section 34 of double-threaded bolt 30 engages a threaded hole in the unmovable arm 22.

The second thread section 34 differs from the first thread section 32 in that it has a larger outside diameter and a higher thread pitch. The thread orientation of the two thread sections 32, 34 is identical, i.e. both thread sections 32, 34 have either a left-handed thread or both have a right-handed thread.

The end of the double-threaded bolt 30 facing the first thread section 32 is connected by a transmission with the shaft of motor 26. With the aid of this motor 26, the double-threaded bolt 30, as a matter of choice, can be put into a right-handed or a left-handed rotation. The result of a rotational motion of double-threaded bolt 30 is that the threaded bolt 30 screws itself into the inside threads in arm 22 and in saw carriage 16 in the same direction, but not over the same distance since, although the threads in the thread sections 32 and 34 do run in the same direction, they have differing pitch. Furthermore, since the arm 22 is attached rigidly to guide rail 18, while saw carriage 16 can execute a longitudinal motion along guide rail 18, the application of the double-threaded bolt 30, with thread sections 32, 34 of unequal pitch, connecting arm 22 and saw carriage 16, achieves the desired precise adjustment capability for the lateral position of the pre-scoring saw blade 10 by the relative motion of saw carriage 16 to the guide rail 18 that is caused by turning the threaded bolt 30 and which is determined by the pitch difference of the thread sections 32, 34.

For the following description of an adjustment procedure it is assumed in that thread sections 32, 34 are provided with right-handed threads, and the threaded bolt 30, viewed from motor 26, executes a left-handed single rotation. During a rotation, the double-threaded bolt 30 screws itself into the inside thread in the unmovable arm 22 by a length corresponding to the pitch S2, i.e. it moved by the distance S2 to the bottom of the drawing after one turn.

Simultaneously, the double-threaded bolt 30 screwed itself through the inside thread in saw carriage 16 by a length corresponding to the pitch S1 of the first thread section 32. The result is that a relative motion between saw carriage 16 and double-threaded bolt 30 by the distance S1 occurred for a single turn of the bolt. From a superimposition of the greater left motion of the threaded bolt 30 in regard to guide rail 18, and the smaller relative motion between the double-threaded bolt 30 and saw carriage 16, an offset movement of saw carriage 16 relative to guide rail 18, and thereby of the circular saw, occurs. This offset movement of saw carriage 16 in regard to the circular saw during one turn of the double-threaded bolt 30 is equal to S2-S1 for each turn of the bolt, i.e. only the difference of the thread pitches of the two thread sections 32 and 34 have an effect on the double-threaded bolt 30 for the offset motion.

A particular advantage of the invention is that an extraordinarily precise saw carriage adjustment is attained without using special threads having extremely small pitch and high manufacturing costs or other expensive measures.

The mounting of guide rail 18 between two pointed studs 20 and 20' allows the entire assembly, consisting of guide rail 18, saw carriage 16, drive carrier 22 and the elements attached to these parts, such as especially the saw blade 10, to swivel around the longitudinal axis of guide rail 18 so that the height that the saw blade 10 extends above a workpiece-supporting surface of a circular saw is adjustable. Furthermore, the lateral position of the pre-scoring saw blade can be measured and read with conventional means.

We claim:

1. A positioning device for precisely adjusting position of a pre-scoring blade of a circular saw having a main circular saw blade, the pre-scoring blade being mounted on a shaft, the device comprising:

a saw carriage to support the shaft on bearings, the saw carriage having at least one threaded hole;

a guide rail parallel to the shaft and having a longitudinal axis, the guide rail being rotatable around the longitudinal axis, a portion of the saw carriage positioned around the guide rail to permit movement of the saw carriage longitudinally along the guide rail;

an arm fastenable to the guide rail so as to be rotatable with the guide rail, the arm having a second threaded hole; and a threaded bolt having a longitudinal bolt axis and being rotatable about the bolt axis, the threaded bolt having a first threaded section and a second threaded section, the first and second threaded sections having identical thread orientation and different thread pitches, the first threaded section engaging the first threaded hole and the second threaded section engaging the second threaded hole.

2. The device according to claim 1, further comprising a drive motor connected to the threaded bolt so as to rotate the threaded bolt.

3. The device according to claim 2, wherein the drive motor and the threaded bolt are jointly moved relative to the second threaded hole in a direction of the bolt axis.

4. The device according to claim 1, wherein the second threaded section has a fixed distance to a cutting plane of the main circular saw blade.

* * * * *